(12) United States Patent
Yoon (10) Patent No.: US 10,511,999 B2
(45) Date of Patent: Dec. 17, 2019

(54) APPARATUS AND METHOD FOR CONTROLLING SIZE OF VOICE PACKET IN WIRELESS COMMUNICATION SYSTEM

(71) Applicant: Samsung Electronics Co., Ltd., Suwon-si, Gyeonggi-do (KR)

(72) Inventor: Taiho Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/768,685

(22) PCT Filed: Nov. 9, 2016

(86) PCT No.: PCT/KR2016/012844
§ 371 (c)(1),
(2) Date: Apr. 16, 2018

(87) PCT Pub. No.: WO2017/082619
PCT Pub. Date: May 18, 2017

(65) Prior Publication Data
US 2018/0302822 A1    Oct. 18, 2018

(30) Foreign Application Priority Data
Nov. 12, 2015 (KR) .................. 10-2015-0158884

(51) Int. Cl.
| | |
|---|---|
| H04W 28/06 | (2009.01) |
| H04W 28/04 | (2009.01) |
| H04W 28/10 | (2009.01) |
| H04W 28/02 | (2009.01) |
| H04W 28/22 | (2009.01) |
| H04L 12/853 | (2013.01) |
| H04L 12/825 | (2013.01) |
| H04L 1/00 | (2006.01) |
| H04W 28/12 | (2009.01) |

(52) U.S. Cl.
CPC .......... *H04W 28/06* (2013.01); *H04L 1/0001* (2013.01); *H04L 47/2416* (2013.01); *H04L 47/26* (2013.01); *H04L 47/263* (2013.01); *H04W 28/0236* (2013.01); *H04W 28/0252* (2013.01); *H04W 28/0268* (2013.01); *H04W 28/04* (2013.01); *H04W 28/10* (2013.01); *H04W 28/22* (2013.01); *H04W 28/12* (2013.01)

(58) Field of Classification Search
None
See application file for complete search history.

(56) References Cited

U.S. PATENT DOCUMENTS

| | | | |
|---|---|---|---|
| 5,703,877 A * | 12/1997 | Nuber | H04N 21/4305 348/462 |
| 6,735,175 B1 | 5/2004 | Havens | |
| 7,092,382 B2 * | 8/2006 | Lucioni | H04L 12/6418 370/352 |
| 7,403,487 B1 | 7/2008 | Foladare et al. | |

(Continued)

*Primary Examiner* — Anh Vu H Ly
(74) *Attorney, Agent, or Firm* — Jefferson IP Law, LLP (57) ABSTRACT

The present disclosure is for controlling a size of a voice packet in a wireless communication system. A method for operating a base station includes: detecting a loss of at least one uplink voice packet; transmitting a downlink voice packet including an indication regarding a sampling rate change of a terminal according to the loss; and receiving an uplink voice packet according to a changed transmission rate.

20 Claims, 9 Drawing Sheets

(56) References Cited

U.S. PATENT DOCUMENTS

| | | |
|---|---|---|
| 8,045,493 B2 | 10/2011 | Gallagher et al. |
| 8,224,657 B2 | 7/2012 | Jelinek et al. |
| 8,326,607 B2 | 12/2012 | Nystrom |
| 9,672,281 B1 * | 6/2017 | Kapoor .................. G06F 16/24 |
| | | 370/328 |
| 9,843,844 B2 * | 12/2017 | Walker ............... H04N 21/6125 |
| | | 370/328 |
| 2002/0059483 A1 | 5/2002 | Park |
| 2006/0268837 A1 | 11/2006 | Larsson et al. |
| 2007/0025324 A1 * | 2/2007 | Kim .................. H04L 29/06027 |
| | | 370/349 |
| 2007/0223469 A1 | 9/2007 | Chandra et al. |
| 2009/0207836 A1 * | 8/2009 | Kawasaki ............ H04B 7/0697 |
| | | 370/352 |
| 2009/0310498 A1 * | 12/2009 | Nogami ................ H04L 1/0006 |
| | | 370/252 |
| 2011/0249630 A1 * | 10/2011 | Kim ...................... H04L 1/0003 |
| | | 370/329 |
| 2012/0236111 A1 * | 9/2012 | Halavy .................. H04N 7/152 |
| | | 348/14.09 |
| 2012/0323585 A1 * | 12/2012 | Elias ...................... G10L 21/04 |
| | | 704/504 |
| 2013/0230057 A1 * | 9/2013 | Hori ...................... H04W 76/10 |
| | | 370/466 |
| 2013/0310959 A1 * | 11/2013 | Sandu .................... G10L 25/60 |
| | | 700/94 |
| 2014/0358526 A1 * | 12/2014 | Abdelal .................. G10L 25/30 |
| | | 704/202 |
| 2016/0241685 A1 * | 8/2016 | Shah ...................... H04L 69/04 |
| | | 370/328 |

* cited by examiner

FIG.8

APPARATUS AND METHOD FOR CONTROLLING SIZE OF VOICE PACKET IN WIRELESS COMMUNICATION SYSTEM

CROSS-REFERENCE TO RELATED APPLICATION(S)

This application is a U.S. National Stage application under 35 U.S.C. § 371 of an International application number PCT/KR2016/012844, filed on Nov. 9, 2016, which is based on and claimed priority of a Korean patent application number 10-2015-0158884, filed on Nov. 12, 2015, in the Korean Intellectual Property Office, the disclosure of which is incorporated by reference herein in its entirety.

TECHNICAL FIELD

The present disclosure relates to controlling a size of a voice packet in a wireless communication system.

BACKGROUND ART

Telephone services in the past mobile communication systems were provided via a public switched telephone network (PSTN). However, with the recent enhancement of communication technology, wide-band mobile data communication services are enabled, and accordingly, data communication-based Internet telephone services, that is, voice over Internet protocol (VoIP) services, are provided. Accordingly, users can use VoIP communication via an access network providing IP connectivity.

The long term evolution (LTE) system, which is a currently commercialized representative cellular system, also supports the VoIP service. The VoIP service provided through the LTE system may be referred to as "VoLTE." In the case of the LTE system, a defined codec may be used for the VoIP service, and a bandwidth of at most about 24 Kbps is assigned to each session. When a terminal is positioned in a cell edge region where radio performance is weak, or is not assigned radio resources enough to transmit packets in a weak electric field, the use of a high capacity bandwidth of about 24 Kbps may cause a packet loss. The packet loss may result in degradation of voice quality, and, in the worst case, may cause forced termination of voice communication.

DETAILED DESCRIPTION OF THE INVENTION

Technical Objects

An embodiment provides an apparatus and a method for controlling a size of a voice packet in a wireless communication system.

Another embodiment provides an apparatus and a method for reducing a size of a voice packet in a wireless communication system.

Still another embodiment provides an apparatus and a method for preventing degradation of quality of voice communication in a wireless communication system.

Yet another embodiment provides an apparatus and a method for preventing a loss of a voice packet in a wireless communication system.

Further embodiment provides an apparatus and a method for preventing termination of voice communication caused by channel degradation in a wireless communication system.

Still further embodiment provides an apparatus and a method for detecting an entry to a shadowing region in a wireless communication system.

Yet further embodiment provides an apparatus and a method for reducing a size of a voice packet when entering a shadowing region in a wireless communication system.

Technical Solving Means

According to an embodiment, a method for operating a base station in a wireless communication system includes: detecting a loss of at least one uplink voice packet; transmitting a downlink voice packet including an indication regarding a sampling rate change of a terminal according to the loss; and receiving an uplink voice packet according to a changed transmission rate.

According to an embodiment, a method for operating a terminal in a wireless communication system includes: transmitting at least one uplink voice packet; receiving a downlink voice packet including an indication regarding a sampling rate change; and transmitting an uplink voice packet according to a changed transmission rate, and the indication is included due to the loss of the at least one uplink voice packet.

According to an embodiment, a base station apparatus in a wireless communication system includes: a controller configured to detect a loss of at least one uplink voice packet; a transmitter configured to transmit a downlink voice packet including an indication regarding a sampling rate change of a terminal according to the loss; and a receiver configured to receive an uplink voice packet according to a changed transmission rate.

According to an embodiment, a terminal apparatus in a wireless communication system includes: a transmitter configured to transmit at least one uplink voice packet; a receiver configured to receive a downlink voice packet including an indication regarding a sampling rate change; and a controller configured to control to transmit an uplink voice packet according to a changed transmission rate, and the indication is included due to the loss of the at least one uplink voice packet.

Advantageous Effect

In a wireless communication system, quality of voice communication can be maintained.

BEST MODE FOR EMBODYING THE INVENTION

Operation principles of various embodiments will be described in detail herein below with reference to the accompanying drawings. In the following description, well-known functions or constructions are not described in detail since they would obscure the invention in unnecessary detail. Also, the terms used herein are defined according to the functions of various embodiments. Thus, the terms may vary depending on user's or operator's intension and usage. That is, the terms used herein must be understood based on the descriptions made herein.

Hereinafter, technology for controlling a size of a voice packet in a wireless communication system will be described. As used herein, terms indicating control information, terms indicating a timer, terms indicating a transmission mode, terms indicating network entities, terms indicating messages, terms indicating elements of the apparatus, etc. are merely examples for convenience of explanation. Accordingly, the present disclosure is not limited to the terms described below and other terms having the same technical meanings may be used.

Figure 1:
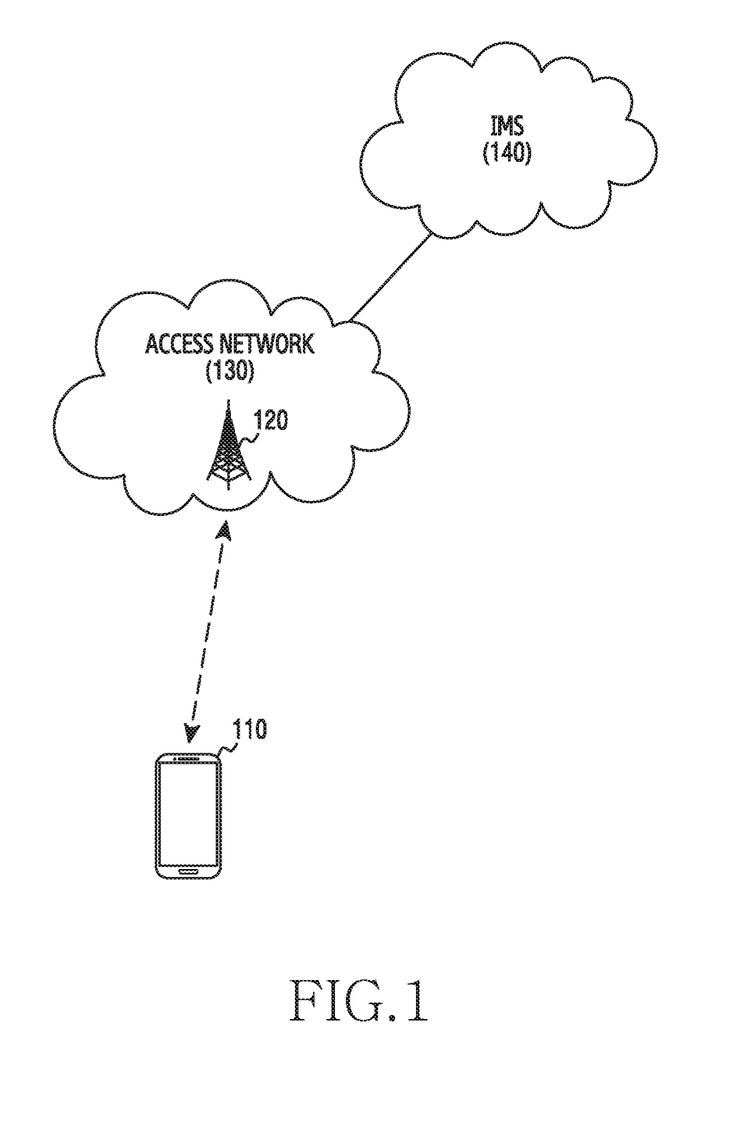
FIG. 1 is a view showing a wireless communication system according to an embodiment.

FIG. 1 illustrates a wireless communication system according to an embodiment. Referring to FIG. 1, the system includes a terminal 110, an access network 130 including a base station 120, and an Internet protocol multimedia subsystem (IMS) 140.

The terminal 110, which is a user device, performs communication with the base station 120 via a wireless channel. The terminal 10 may provide a VoIP function and execute an application for a VoIP service according to a user's command. Accordingly, the terminal 110 may transmit and receive voice packets for the VoIP service to and from the base station 120. According to various embodiments, the terminal 110 may be a portable electronic device, and may be one of a smart phone, a portable terminal, a mobile phone, a mobile pad, a media player, a tablet computer, a handheld computer, or a personal digital assistant (PDA). According to another embodiment, the terminal 110 may be a stationary device. In addition, the terminal 110 may be a device combining two or more functions of the above-described devices.

The base station 120 provides a wireless access to the terminal 110. The base station 120, which is one of the entities constituting the access network 130, may have a coverage including a predetermined geographical range. The base station 120 may be referred to as a nodeB (NB), an evolved nodeB (eNB), etc. The access network 130 may further include another entity such as a gateway, etc. as well as the base station 120, as a system for connecting the terminal 110 to a core network (for example, an Internet protocol (IP) network).

The IMS 140 is a subsystem for managing a session. The IMS 140 may be operated independently from the access network 130. The IMS 140 may provide a multimedia service such as a voice, an audio, a video, data, etc. based on the IP. When the terminal 110 performs voice communication with the other party via the VoIP service, voice packets may be transmitted and received via the IMS 140. The IMS 140 may include a proxy-call session control function (P-CSCF), a serving-call session control function (S-CSCF), an interrogating-call session control function (I-CSCF), a PCRF, a home subscriber server (HSS), etc.

Figure 2:
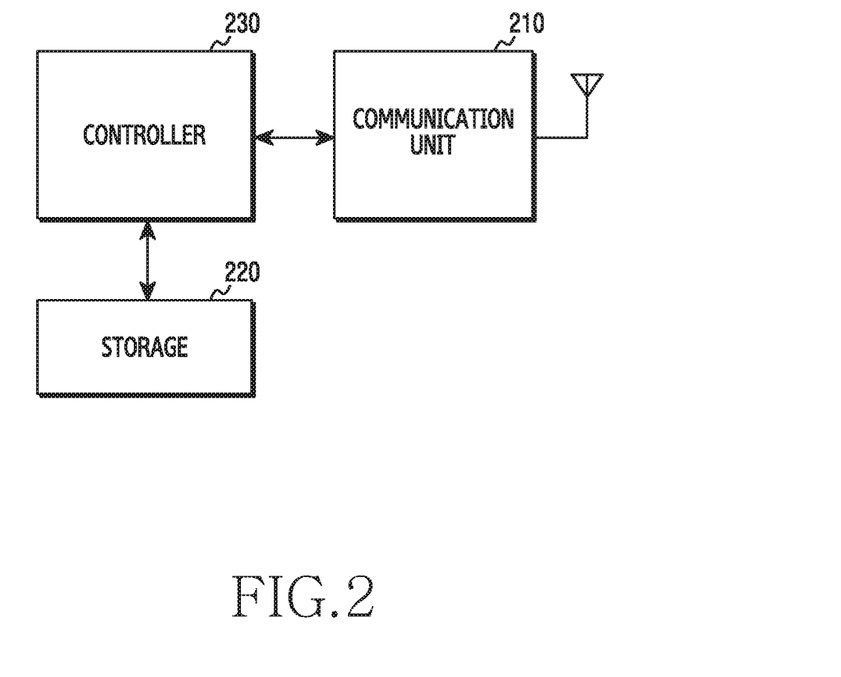
FIG. 2 is a view showing a configuration of a terminal in a wireless communication system according to an embodiment.

FIG. 2 illustrates a configuration of a terminal in a wireless communication system according to an embodiment. FIG. 2 illustrates a configuration of the terminal 110. The term "unit" or terms ending with suffixes "-er," and "-or" used herein refer to a unit processing at least one function or operation, and may be implemented by hardware, software, or a combination of hardware and software. Referring to FIG. 2, the terminal 110 includes a communication unit 210, a storage 220, and a controller 230.

The communication unit 210 may perform functions for transmitting and receiving signals via a wireless channel. For example, the communication unit 210 may perform a function of converting between a baseband signal and a bit sequence according to a physical layer standard of the system. For example, when transmitting data, the communication unit 210 may generate complex symbols by encoding and modulating a transmission bit sequence. In addition, when receiving data, the communication unit 210 may restore a reception bit sequence by demodulating and decoding a baseband signal. In addition, the communication unit 210 may up-convert a baseband signal into a radio frequency (RF) band signal, and then may transmit the signal via an antenna, and may down-convert an RF band signal received via the antenna into a baseband signal. For example, the communication unit 210 may include a transmission filter, a reception filter, an amplifier, a mixer, an oscillator, a digital to analog converter (DAC), an analog to digital converter (ADC), etc.

As described above, the communication unit 210 may transmit and receive signals. Accordingly, the communication unit 210 may be referred to as a transmitter, a receiver, or a transceiver. In addition, in the following description, transmitting and receiving via a wireless channel refers to performing, by the communication unit 210, the above-described processing.

The storage 220 may store data such as a basic program for the operation of the terminal 110, an application program, setting information, etc. The storage 220 may be configured by a volatile memory, a nonvolatile memory, or a combination of a volatile memory and a nonvolatile memory. In addition, the storage 220 may provide stored data according to a request of the controller 230.

The controller 230 may control overall operations of the terminal 110. For example, the controller 230 may transmit and receive signals via the communication unit 210. In addition, the controller 230 may write and read data on and from the storage 220. To achieve this, the controller 230 may include at least one processor or micro-processor or may be configured as a portion of the processor. In addition, a portion of the communication unit 210 and the controller 230 may be referred to as a communication processor (CP). In particular, the controller 230 may control the terminal 100 to adjust a size of a voice packet according to a request of the base station 120 according to various embodiments, which will be described below. For example, the controller 230 may control the terminal 110 to perform a procedure according to various embodiments, which will be described below.

Figure 3:
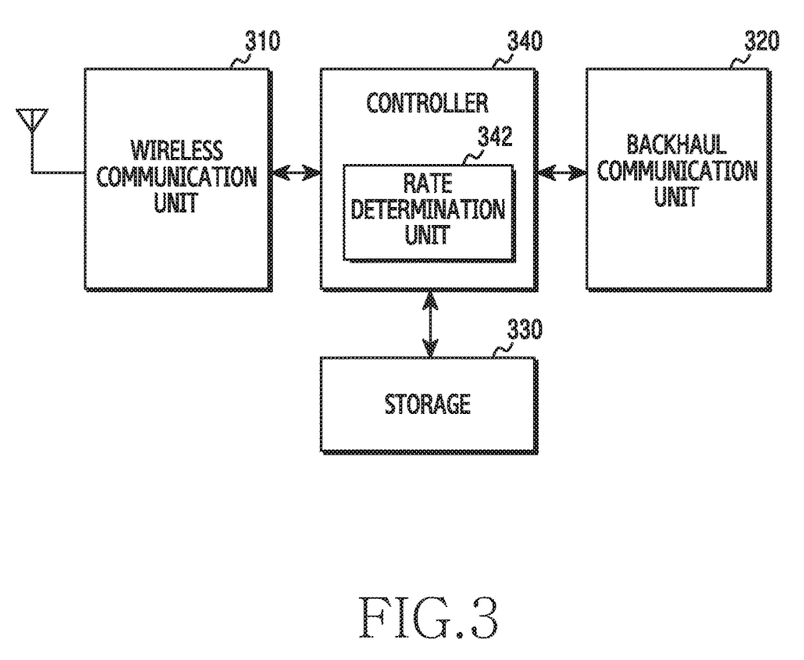
FIG. 3 is a view showing a configuration of a base station in a wireless communication system according to an embodiment.

FIG. 3 illustrates a configuration of a base station in a wireless communication system according to an embodiment. FIG. 3 illustrates a configuration of die base station 120. The term "unit" or terms ending with suffixes "-er," and "-or" used herein refer to a unit processing at least one function or operation, and may be implemented by hardware, software, or a combination of hardware and software. As shown in FIG. 3, the base station 120 includes a wireless communication unit 310, a backhaul communication unit 320, a storage 330, and a controller 340.

The wireless communication unit 310 may perform functions for transmitting and receiving signals via a wireless channel. For example, the wireless communication unit 310 may perform a function of converting between a baseband signal and a bit sequence according to a physical layer standard of the system. For example, when transmitting data, the wireless communication unit 310 may generate complex symbols by encoding and modulating a transmission bit sequence. In addition, when receiving data, the wireless communication unit 310 may restore a reception bit sequence by demodulating and decoding a baseband signal. In addition, the wireless communication unit 210 may up-convert a baseband signal into an RF band signal, and then may transmit the signal via an antenna, and may down-convert an RF band signal received via the antenna into a baseband signal. For example, the wireless communication unit 310 may include a transmission filter, a reception filter, an amplifier, a mixer, an oscillator, a DAC, an ADC, etc.

As described above, the wireless communication unit 310 may transmit and receive signals. Accordingly, the wireless communication unit 310 may be referred to as a transmitter, a receiver, or a transceiver. In addition, in the following description, transmitting and receiving via a wireless channel refers to performing, by the wireless communication unit 310, the above-described processing.

The backhaul communication unit 320 provides an interface for performing communication with other nodes. That is, the backhaul communication unit 320 may convert a bit sequence transmitted from the base station 120 to another node, for example, another access node, another base station, a core network, etc., into a physical signal, and may convert a physical signal received from another node into a bit sequence.

The storage 330 may store data such as a basic program for the operation of the terminal, an application program, setting information, etc. The storage 330 may be configured by a volatile memory, a nonvolatile memory, or a combination of a volatile memory and a nonvolatile memory. In addition, the storage 330 may provide stored data according to a request of the controller 340.

The controller 340 may control overall operations of the base station 120. For example, the controller 340 may transmit and receive signals via the wireless communication unit 310 or the backhaul communication unit 320. In addition, the controller 340 may write and read data on and from the storage 330. To achieve this, the controller 340 may include at least one processor. According to an embodiment, the controller 340 may detect a loss of a voice packet transmitted from the terminal 110, and control a size of the voice packet. To achieve this, the controller 340 may include a rate determination unit 342. For example, the controller 340 may control the base station 120 to perform a procedure according to various embodiments, which will be described below.

As described above, the terminal 110 may perform voice communication by using the VoIP service. In this case, the terminal 110 may use a codec to generate a voice packet including voice data. For example, an adaptive multi-rate wideband (AMR-WB) codec may be used. A sampling rate of initial voice information may be determined by a session initiation protocol (SIP)/session description protocol (SDP).

The AMR-WB defines sampling rates of voice information as a plurality of modes as shown in table 1 presented below:

TABLE 1

| Frame type index | Mode indicator | Mode request | Frame content (AMR-WB mode) |
|---|---|---|---|
| 0 | 0 | 0 | AMR-WB 6.60 kbit/s |
| 1 | 1 | 1 | AMR-WB 8.85 kbit/s |
| 2 | 2 | 2 | AMR-WB 12.65 kbit/s |
| 3 | 3 | 3 | AMR-WB 14.25 kbit/s |
| 4 | 4 | 4 | AMR-WB 15.85 kbit/s |
| 5 | 5 | 5 | AMR-WB 18.25 kbit/s |
| 6 | 6 | 6 | AMR-WB 19.85 kbit/s |
| 7 | 7 | 7 | AMR-WB 23.05 kbit/s |
| 8 | 8 | 8 | AMR-WB 23.85 kbit/s |
| 9 | — | — | AMR-WB SID (silence descriptor) |
| 10-13 | — | — | |
| 14 | — | — | Speech lost |
| 15 | — | — | No data |

The sampling rate refers to a frequency of sampling values when digital data is generated. Accordingly, as the sampling rate increases, the size of sampled voice data increases. That is, a high sampling rate increases the size of the voice packet. Accordingly, the base station 120 according to an embodiment may reduce the size of the voice packet transmitted by the terminal 110 by adjusting the sampling rate of the voice packet. Accordingly, even when a channel environment is poor or assigned resources are not enough, the terminal 110 may successfully transmit the voice packet.

Figure 4A:
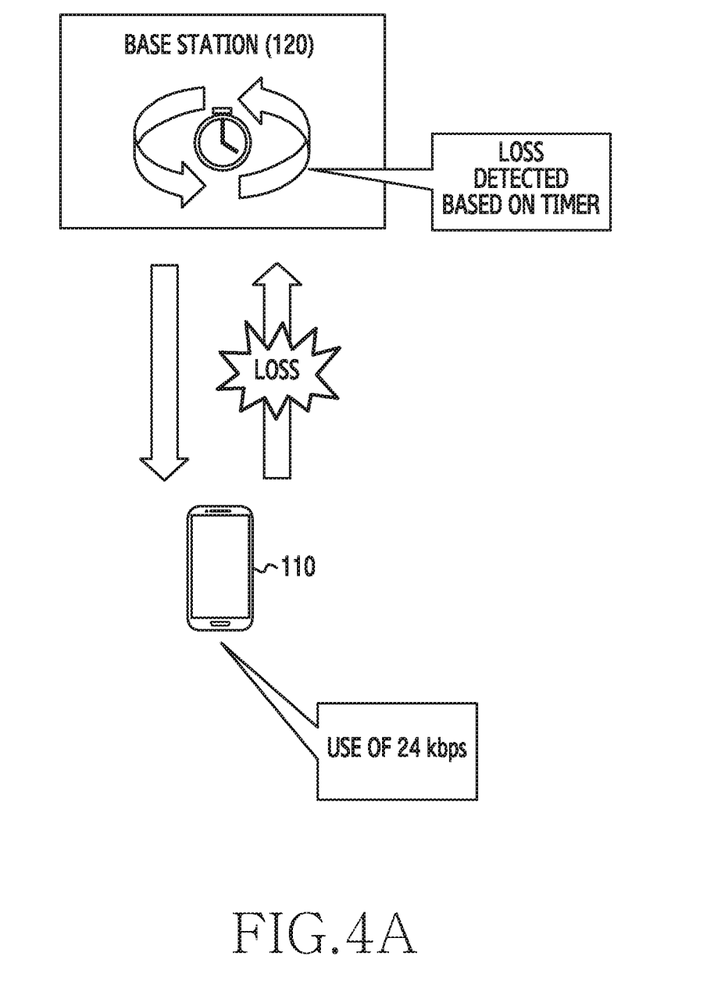
FIGS. 4A and 4B are views showing controlling a size according to a loss of a voice packet in a wireless communication system according to an embodiment.
Figure 4B:
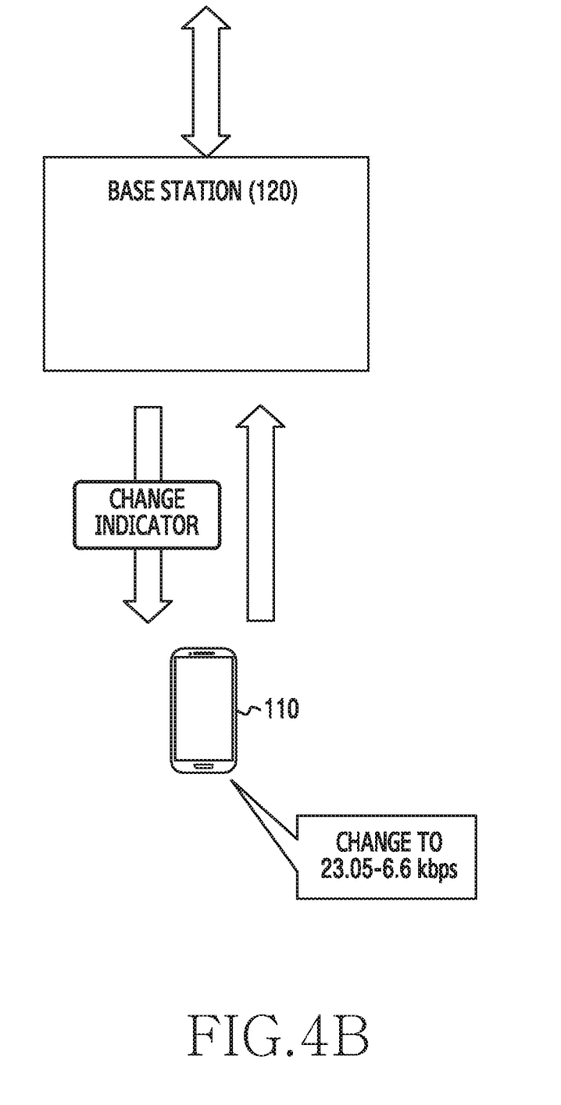

Controlling a loss of voice packets transmitted from the terminal 110 and the sampling rate may be performed as follows. FIGS. 4A and 4B illustrate controlling a size of a voice packet according to a loss of the voice packet in a wireless communication system according to an embodiment. FIG. 4A illustrates detection of a loss, and FIG. 4B illustrates a sampling rate change request.

Referring to FIG. 4A, the terminal 110 generates a voice packet at a sampling rate of 24 kbps. The terminal 110 may transmit the voice packet to the base station 120, but the voice packet may be lost due to channel degradation, etc. For example, in the case of an LTE system, since a voice packet is transmitted in a radio link control layer in an un-acknowledge mode (UM), there is a possibility that the voice packet is lost. In this case, the base station 120 detects the loss. The loss of the packet may be determined according to various criteria. For example, when a sequence number (SN) of a packet (for example, a packet data convergence protocol (PDCP) sequence number) is not continuous, the loss may be determined. In another example, when a decoding error (for example, a cyclic redundancy check (CRC) error) occurs, the loss may be determined.

To more exactly determine a situation, the base station 120 may analyze a loss pattern based on a timer. For example, when a packet loss is detected a predetermined number of times (for example, two times), the base station 120 may drive the timer. By analyzing using the timer, the base station 120 may determine whether the packet loss is a temporary phenomenon or a continuous phenomenon. Specifically, the base station 120 may start a periodic timer of a defined time length (for example, 1 second), and may monitor a loss pattern until the timer expires. In addition, the base station 120 may analyze a loss pattern monitored during a collection time. As a result of analyzing, when the lost voice packets are monitored as a one-time burst loss, the base station 120 may determine the one-time loss and stop the timer. On the other hand, when a randomly sporadic loss pattern is monitored, the base station 120 may determine that the terminal 110 enters a shadowing region, and may trigger a mode change, that is, a sampling rate change. Herein, the sporadic loss pattern refers to packet losses that are not continuous and irregularly occur. Specifically, the sporadic loss pattern may be determined based on at least one of the criterion that loss groups at least greater than or equal to a threshold number are monitored within a predetermined time section, the criterion that a distribution of intervals of the loss is greater than or equal to a predetermined reference value, and the criterion that a plurality of loss groups including different numbers of losses are monitored. That is, the sporadic loss refers to a pattern of a packet loss that randomly occurs for a monitored time, rather than one-time continuous packet losses. In other words, the sporadic loss refers to repetitive reception and loss of packets. The sampling rate may be changed as shown in FIG. 4B. The sampling rate may be changed as shown in FIG. 4B.

Referring to FIG. 4B, the base station 120 transmits a change indicator to the terminal 110. The change indicator may be included in a downlink voice packet as control information. When a voice packet is generated by the AMR-WB codec, the voice packet may be configured as shown in FIG. 5.

Figure 5:
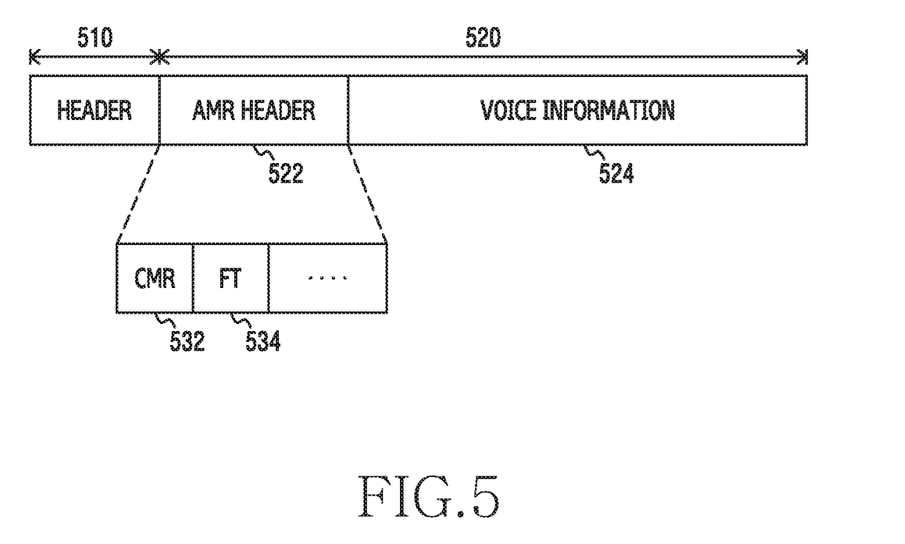
FIG. 5 is a view showing an example of a configuration of a voice packet in a wireless communication system according to an embodiment.

FIG. 5 illustrates a configuration example of a voice packet in a wireless communication system according to an embodiment. Referring to FIG. 5, the voice packet includes a header 510 and a payload 520. The payload may be voice data that is generated by the AMR-WB codec, and may include an AMR header 522 and voice information 524. The AMR header 522 may include a change mode request (CMR) field 532 and a frame type (FT) field 534. Herein, the CMR field 532 may be assigned to first four bits of the AMR header 522, and according to an embodiment, may be used as a change indicator. That is, according to the above-described loss detection and the result of the loss pattern analysis, the base station 120 may set the CMR field 532 to a value for the mode change, such that a sampling rate lower than a sampling rate currently used in the terminal 110 can be induced to be used.

The terminal 110 which receives the voice packet in which the CMR field 532 is set may change the sampling rate used when the voice packet is generated to one of 6.6 to 23.05 kbps. Accordingly, the terminal 110 may encode voice information according to the changed sampling rate, and may transmit a voice packet smaller than previous one via an uplink. Thereafter, the base station 120 which receives the uplink voice packet the sampling rate of which is changed may stop setting the CRM bit.

In the embodiment described with reference to FIGS. 4A and 4B, the base station 120 may determine whether a packet loss is temporary or continuous by analyzing the loss pattern. According to another embodiment, the base station 120 may determine whether the packet loss is temporary based on a time for which the loss is held. That is, when the packet loss continuously occurs for more than a pre-defined time, the base station 120 may determine that the packet loss is a continuous loss.

Figure 6:
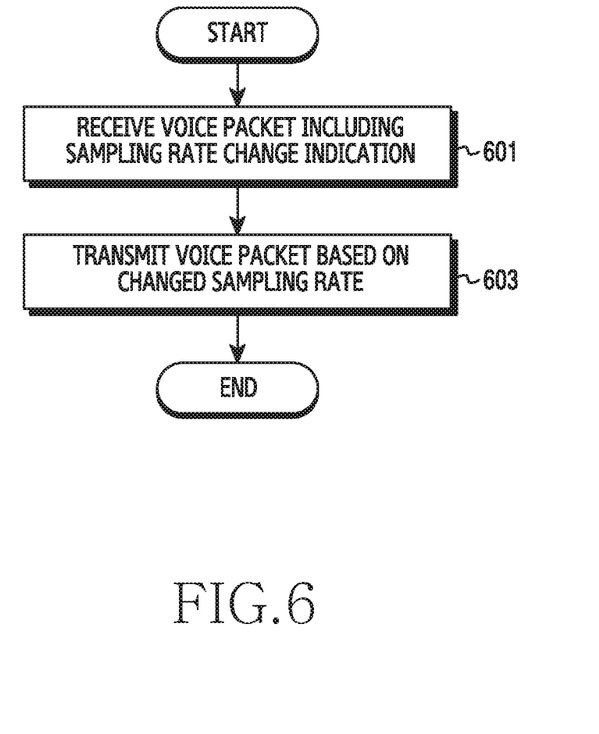
FIG. 6 is a view showing an operation procedure of a terminal in a wireless communication system according to an embodiment.

FIG. 6 illustrates an operation procedure of a terminal in a wireless communication system according to an embodiment. FIG. 6 illustrates a method for operating the terminal 110.

Referring to FIG. 6, the terminal receives a voice packet including an indication regarding a sampling rate change in step 601. That is, a downlink voice packet received at the terminal includes information indicating a change of a sampling rate regarding an uplink voice packet. For example, the indication regarding the change of the sampling rate may be included in a CMR field of an AMR header included in the voice packet. Furthermore, the indication may specify a sampling rate to be changed.

Thereafter, in step 603, the terminal may transmit a voice packet based on the changed sampling rate. Specifically, the terminal may generate voice information at the indicated sampling rate, generate an uplink voice packet including voice information, and then transmit the uplink voice packet.

Figure 7:
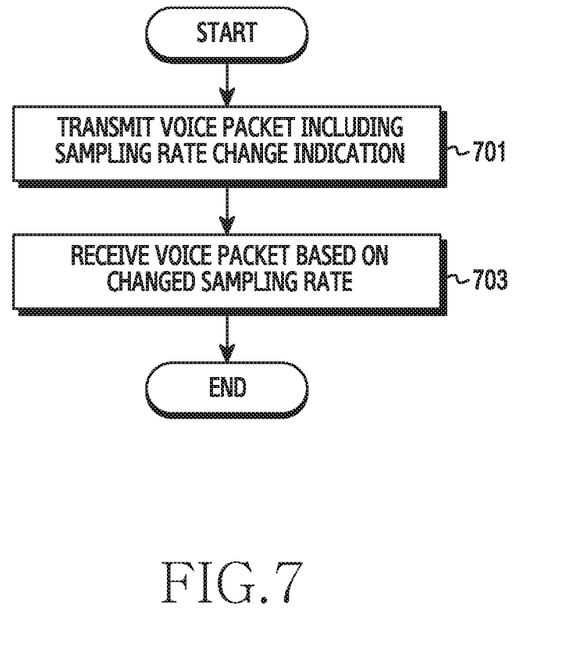
FIG. 7 is a view showing an operation procedure of a base station in a wireless communication system according to an embodiment.

FIG. 7 illustrates an operation procedure of a base station in a wireless communication system according to an embodiment. FIG. 7 illustrates a method for operating the base station 120.

Referring to FIG. 7, the base station transmits a voice packet including an indication regarding a sampling rate change in step 701. That is, the downlink voice packet transmitted to the terminal includes information indicating a change of a sampling rate regarding an uplink voice packet. In this case, the indication of the sampling rate change may be included in response to detection of the loss of the uplink voice packet. Specifically, due to a continuous loss of the uplink voice packet, the base station may transmit the voice packet including the indication regarding the sampling rate change. To determine the continuous loss, the base station may analyze the loss pattern. Alternatively, to determine the continuous loss, the base station may monitor a length of a time section in which the continuous loss occurs. For example, the indication regarding the sampling rate change may be included in a CMR field of an AMR header included in the voice packet. Furthermore, the indication may specify a sampling rate to be changed.

Thereafter, in step 703, the base station may receive a voice packet based on the changed sampling rate. Specifically, the terminal may generate voice information at the indicated sampling rate, generate an uplink voice packet including the voice information, and then transmit the uplink voice packet.

Figure 8:
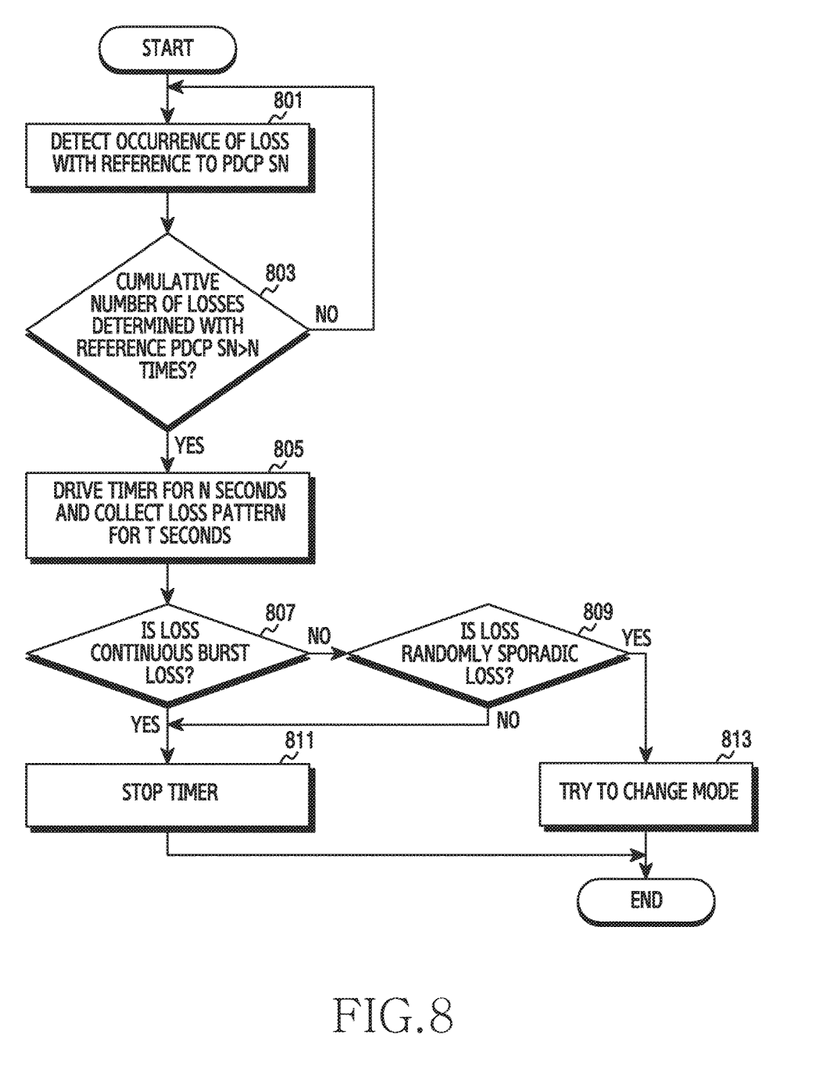
FIG. 8 is a view showing an operation procedure of a base station in a wireless communication system according to another embodiment.

FIG. 8 illustrates an operation procedure of a base station in a wireless communication system according to another embodiment. FIG. 8 illustrates a method for operating the base station 120.

Referring to FIG. 8, the base station detects the loss of a voice packet with reference to a PDCP sequence number in step 810. When a packet is not lost, the PCDP sequence numbers of received packets are continuous. Accordingly, when the PDCP sequence numbers do not sequentially increase and have a gap therebetween, the base station may determine the loss of the packet.

In step 803, the base station may compare a cumulative number of losses determined with reference to the PDCP sequence numbers, and a threshold value. In FIG. 8, the threshold value is expressed by n. When the cumulative number of losses is less than the threshold value, the base station may resume step 801.

On the other hand, when the cumulative number of losses exceeds the threshold value, the base station may drive a timer for N seconds and collect a loss pattern for T seconds. In other words, the base station monitors the loss of the packet occurring during a defined time section. Herein, the loss pattern may include the number of losses, a time interval of the loss, and a length of a total time section in which the loss occurs.

In step 807, the base station determines whether the loss is a continuous burst loss. In other words, the base station may determine whether the analyzed loss pattern corresponds to the burst loss. That is, the base station may determine whether the loss is a temporary loss. When the loss is not the burst loss, the base station determines whether the loss is a randomly sporadic loss in step 809. In other words, the base station may determine whether the analyzed loss pattern corresponds to the randomly sporadic loss. That is, the base station may determine whether the loss is a continuous loss.

When the loss is determined to be the burst loss, the base station stops the timer in step 811. That is, the base station may determine the packet loss as a temporary phenomenon, and may determine that the terminal does not enter the shadowing region. Accordingly, the base station may not request a sampling rate change.

When the loss is determined to be the randomly sporadic loss, the base station tries to change a mode in step 813. That is, the base station may determine that the packet loss is a continuous phenomenon and may determine that the terminal enters a shadowing region or a cell edge region. Accordingly, the base station may request a sampling rate change. Specifically, the base station may include an indication regarding the sampling rate change in a downlink voice packet.

Through the above-described various embodiments, a call drop caused by the packet loss can be prevented in a shadowing region in which it is difficult to assign radio resources. In other words, in the shadowing region in which it is difficult to assign radio resources, the call drop caused by the loss can be prevented by reducing a use rate of radio resources for the VoIP service.

Methods based on the embodiments disclosed in the claims or specification of the present disclosure may be implemented in hardware, software, or a combination of both.

The software may be stored in a computer-readable storage medium. When being implemented by at least one processor in at least one program (software module) or an electronic device, the computer-readable storage medium may store at least one program including instructions for the electronic device to perform the methods of the present disclosure.

The software may be stored in a volatile storage device or a nonvolatile storage device such as a read only memory (ROM), a memory such as a random access memory (RAM), a memory chip, a device, or integrated circuits, or an optical or magnetic readable medium such as a compact disc-ROM (CD-ROM), digital versatile discs (DVDs), a magnetic disk, or a magnetic tape.

The storage devices and the storage media are embodiments of machine-readable storage means appropriate to store a program or programs including instructions for implementing embodiments. Embodiments provide a program including a code for implementing the apparatus or method as claimed in any one of the claims of the present disclosure, and a machine-readable storage medium storing such a program. Furthermore, such programs may be electronically transmitted by a certain medium such as a communication signal transmitted wiredly or wirelessly, and embodiments appropriately includes equivalents.

In the above-described specific embodiments, elements included in the present disclosure are expressed in singular or plural forms according to specific embodiments. However, singular or plural forms are appropriately selected according to suggested situations for convenience of explanation, and the above-described embodiments are not limited to a single element or plural elements. An element which is expressed in a plural form may be configured in a singular form or an element which is expressed in a singular form may be configured in plural number.

While the invention has been shown and described with reference to specific embodiments, it will be understood by those skilled in the art that various changes in form and details may be made therein without departing from the spirit and scope of the invention as defined by the appended claims. Therefore, the scope of the invention should be defined not by the embodiments described above but by the appended claims or equivalents to the claims.

What is claimed is:

1. A method for operating a base station in a wireless communication system, the method comprising:
    detecting, during a predetermined time interval, a loss of at least one uplink voice packet transmitted from a terminal;
    identifying a loss pattern for a shadowing region based on the detected loss;
    transmitting, to the terminal, a downlink voice packet comprising an indication for changing a sampling rate for an uplink voice packet after the loss pattern is identified; and
    receiving, from the terminal, the uplink voice packet based on the changed sampling rate,
    wherein a size of the uplink voice packet is changed according to the changed sampling rate.

2. The method of claim 1,
    wherein the loss pattern for the shadowing region comprises at least one of a randomly sporadic pattern or a pattern indicating continuous losses longer than a predefined length,
    wherein the predetermined time interval is determined by a timer of the base station, and
    wherein the method further comprises:
        in case that the loss pattern for the shadowing region is not identified, controlling to suspend the timer.

3. The method of claim 1, wherein the detecting of the loss of the at least one uplink voice packet comprises:
    detecting the loss of the at least one uplink voice packet based on a gap occurring between consecutive packet data convergence protocol (PDCP) sequence numbers;
    identifying whether a number of losses comprising the loss of the at least one uplink voice packet is larger than a threshold value; and
    in case that it is identified that the number of losses is larger than the threshold value, controlling to drive a timer for detecting the loss of the at least one uplink voice packet.

4. The method of claim 1, wherein the loss pattern comprises at least one of a number of losses, a time interval between each of the losses, or a total time interval that the losses are detected.

5. The method of claim 1,
    wherein voice data included in the downlink voice packet is encoded by an adaptive multi-rate wideband (AMR-WB) scheme, and
    wherein the indication is included in a change mode request (CMR) field that is allocated to first four bits of an AMR header in the downlink voice packet.

6. A method for operating a terminal in a wireless communication system, the method comprising:
    transmitting, to a base station, at least one uplink voice packet, wherein a loss of the at least one uplink voice packet is detected by the base station during a predetermined time interval;
    receiving, from the base station, a downlink voice packet comprising an indication for changing a sampling rate for an uplink voice packet in case that a loss pattern for a shadowing region is identified based on the detected loss; and transmitting, to the base station, the uplink voice packet based on the changed sampling rate, wherein a size of the uplink voice packet is changed according to the changed sampling rate.

7. The method of claim 6, wherein the loss pattern for the shadowing region comprises at least one of a randomly sporadic pattern or a pattern indicating continuous losses longer than a predefined length, wherein the predetermined time interval is determined by a timer of the base station, and wherein, in case that the loss pattern for the shadowing region is not identified, the timer is controlled to be suspended.

8. The method of claim 6, wherein the detecting of the loss of the at least one uplink voice packet comprises:

detecting the loss of the at least one uplink voice packet based on a gap occurring between consecutive packet data convergence protocol (PDCP) sequence numbers;

identifying whether a number of losses comprising the loss of the at least one uplink voice packet is larger than a threshold value; and controlling to drive a timer for detecting the loss of the at least one uplink voice packet in case that it is identified that the number of losses is larger than the threshold value.

9. The method of claim 6, wherein the loss pattern comprises at least one of a number of losses, a time interval between each of the losses, or a total time interval that the losses are detected.

10. The method of claim 6, wherein voice data included in the downlink voice packet is encoded by an adaptive multi-rate wideband (AMR-WB) scheme, and wherein the indication is included in a change mode request (CMR) field that is allocated to first four bits of an AMR header in the downlink voice packet.

11. A base station in a wireless communication system, the base station comprising:

a transceiver; and at least one processor operably coupled to the transceiver, wherein the at least one processor is configured to:

detect, during a predetermined time interval, a loss of at least one uplink voice packet transmitted from a terminal, identify a loss pattern for a shadowing region based on the detected loss, transmit, to the terminal, a downlink voice packet comprising an indication for changing a sampling rate for an uplink voice packet after the loss pattern is identified, and receive, from the terminal, the uplink voice packet based on the changed sampling rate, and wherein a size of the uplink voice packet is changed according to the changed sampling rate.

12. The base station of claim 11, wherein the loss pattern for the shadowing region comprises at least one of a randomly sporadic pattern or a pattern indicating continuous losses longer than a predefined length, wherein the predetermined time interval is determined by a timer of the base station, and wherein the at least one processor is further configured to:

in case that the loss pattern for the shadowing region is not identified, control to suspend the timer.

13. The base station of claim 11, wherein, in order to detect the loss of the at least one uplink voice packet, the at least one processor is further configured to:

detect the loss of the at least one uplink voice packet based on a gap occurring between consecutive packet data convergence protocol (PDCP) sequence numbers, identify whether a number of losses comprising the loss of the uplink voice packet is larger than a threshold value, and in case that it is identified that the number of losses is larger than the threshold value, control to drive a timer for detecting the loss of the at least one uplink voice packet.

14. The base station of claim 11, wherein the loss pattern comprises at least one of a number of losses, a time interval between each of the losses, or a total time interval that the losses are detected.

15. The base station of claim 11, wherein voice data included in the downlink voice packet is encoded by an adaptive multi-rate wideband (AMR-WB) scheme, and wherein the indication is included in a change mode request (CMR) field that is allocated to first four bits of an AMR header in the downlink voice packet.

16. A terminal in a wireless communication system, the terminal comprising:

a transceiver; and at least one processor operably coupled to the transceiver, wherein the at least one processor is configured to:

transmit, to a base station, at least one uplink voice packet, wherein a loss of the at least one uplink voice packet is detected by the base station during a predetermined time interval, receive, from the base station, a downlink voice packet comprising an indication for changing a sampling rate for an uplink voice packet in case that a loss pattern for a shadowing region is identified based on the detected loss, and transmit, to the base station, the uplink voice packet based on the changed sampling rate, and wherein a size of the uplink voice packet is changed according to the changed sampling rate.

17. The terminal of claim 16, wherein the loss pattern for the shadowing region comprises at least one of a randomly sporadic pattern or a pattern indicating continuous losses longer than a predefined length, wherein the predetermined time interval is determined by a timer of the base station, and wherein, in case that the loss pattern for the shadowing region is not identified, the timer is controlled to be suspended.

18. The terminal of claim 16, wherein the loss of the at least one uplink voice packet is detected by detecting the loss of the at least one uplink voice packet based on a gap occurring between consecutive packet data convergence protocol (PDCP) sequence numbers, identifying whether a number of losses comprising the loss of the uplink voice packet is larger than a threshold value, and controlling to drive a timer for detecting the loss of the at least one uplink voice packet in case that it is identified that the number of losses is larger than the threshold value.

19. The terminal of claim 16,
wherein the loss pattern comprises at least one of a number of losses, a time interval between each of the losses, or a total time interval that the losses are detected.

20. The terminal of claim 16,
wherein voice data included in the downlink voice packet is encoded by an adaptive multi-rate wideband (AMR-WB) scheme, and
wherein the indication is included in a change mode request (CMR) field that is allocated to first four bits of an AMR header in the downlink voice packet.

* * * * *